US006580778B2

United States Patent
Meder

(10) Patent No.: US 6,580,778 B2
(45) Date of Patent: Jun. 17, 2003

(54) INSPECTION DEVICE

(75) Inventor: Claus Meder, Rossdorf (DE)

(73) Assignee: Heimann Systems GmbH, Wiesbaden (DE)

(*) Notice: Subject to any disclaimer, the term of this patent is extended or adjusted under 35 U.S.C. 154(b) by 0 days.

(21) Appl. No.: 10/152,613

(22) Filed: May 23, 2002

(65) Prior Publication Data
US 2002/0176534 A1 Nov. 28, 2002

Related U.S. Application Data
(60) Provisional application No. 60/301,134, filed on Jun. 28, 2001.

(30) Foreign Application Priority Data
May 23, 2001 (DE) .......................... 101 25 532

(51) Int. Cl.$^7$ .............................................. G01N 23/04
(52) U.S. Cl. ...................................................... 378/57
(58) Field of Search ........................................... 378/57

(56) References Cited
FOREIGN PATENT DOCUMENTS

| EP | 0 825 457 | 2/1998 |
|---|---|---|
| EP | 0 984 302 | 3/2000 |

Primary Examiner—Craig E. Church
(74) Attorney, Agent, or Firm—Birch, Stewart, Kolasch & Birch, LLP

(57) ABSTRACT

The invention relates to an inspection device for inspecting objects, particularly for explosives. The invention makes provision, particularly where space for the inspection system is tight, to use at least the available area as a scanning area, around which is arranged at least one movable radiation source at which is aimed a detector arrangement that can be moved mechanically independently of the radiation source. In this context, the radiation source and also the detector arrangement can be moved parallel to and simultaneously with one another by mechanical or electrical coupled actuators. The synchronous movement is controlled and monitored with the aid of a computer. Because of the tight space, provision is further made for the object to be scanned in the direction of and opposite to the direction of transport of the object, wherein the object is scanned once with low-energy radiation, and subsequently is scanned with high-energy radiation. The image segments thus generated are recorded separately, stored, and analyzed together.

16 Claims, 4 Drawing Sheets

INSPECTION DEVICE

This application claims priority under 35 U.S.C. §119 of U.S. Provisional Application No. 60/301,134 filed on Jun. 28, 2001, and German Application No. 101 25 532.2, filed on May 23, 2001, the entire contents of each of which are herein incorporated by reference.

BACKGROUND OF THE INVENTION

1. Field of the invention

The present invention relates to an inspection device for inspecting objects, particularly for explosives and/or explosive substances in travelers' baggage.

2. Description of the Background Art

In view of heightened security requirements at airports and other public facilities, it is necessary to retrofit existing facilities, for example check-in counters in airports, with X-ray and inspection devices which can detect explosives and/or explosive substances, in particular. Oftentimes, only a small space is available for integration of such a retrofit device.

Known from EP 0 825 457 A2 is a tomographic scanner for detecting contraband items in passenger baggage, including explosives, which is moved about a piece of luggage. During the process, for instance, the piece of luggage is inspected from eight different directions in one radiation plane. Disadvantages of such scanners include the extensive mechanical structure and also the large installation space required.

EP 0 984 302 A1 describes a method and an apparatus of this type for examining luggage by X-ray scanning. The piece of luggage to be examined is moved on a conveyor belt into a scanner that, by means of a common arm, moves an X-ray unit and a detector unit relative to the luggage item. Scanning is performed in steps. For this purpose, the piece of luggage is conveyed in until its advance is stopped by a light signal. Then, the scanning motion over the luggage is started in the manner of a windshield wiper, wherein the X-ray unit and the detector unit are moved from one position to a second position. Thereafter, the piece of luggage is conveyed one step further in the transport direction and the X-ray unit and the detector unit are moved back from the second position to the first position for scanning. According to another embodiment, the X-ray unit and the detector unit are moved back and forth on a carriage transverse to the conveyor's transport direction.

It is an object of the invention to provide an inspection device that works in a small space and is suitable for retrofitting.

SUMMARY OF THE INVENTION

According to the principles of this invention, an inspection device is used for the inspection of objects, whereby the object to be inspected is moved between at least one radiation source and one linear detector arrangement directed at the radiation source for scanning the stationary object. The radiation source and the detector arrangement are then moved in parallel over the object so that the object is scanned in the direction of and opposite to the transport direction of the object. During a first scan, the object is scanned with low-energy radiation, and during a second scan the object is scanned with high-energy radiation.

Because the available space within a separate piece of equipment is very small, the invention is based on the idea of using this space at least as a scanning area, around which at least one movable radiation source is arranged, at which a detector arrangement is directed that can be moved mechanically independently of the radiation source. In this context, the radiation source and also the detector arrangement can be moved parallel to and simultaneously with one another by mechanically or electrically coupled means, such as actuators. The synchronous movement is controlled and monitored with the aid of a computer.

The detector arrangement can include multiple detector pairs that are accommodated in a linear detector.

To create a usable radiation tunnel in this limited space, existing equipment components of the separate piece of equipment that is not part of the inspection device, are integrated into the inspection device, or vice versa. To this end, a shield, for example in the form of a hood, is placed ahead of the scanning area and on or around the system component of the separate piece of equipment. In the event that at least one system component of the equipment following the available scanning area is also integrated, it is also possible to place shielding on or around this system component. Frequently, the direct integration into a shielded housing of the inspection system is offered. In this way, at least one system component or an entire section of a piece of equipment that is functionally separate from the inspection system can be used, and thus in a larger sense becomes a part of the inspection device without removal of the system component itself from the actual equipment and without limitation of its actual functional use.

In a further embodiment of the invention, a closable curtain or roller shutter is integrated in the shield, which, in a preferred variant, is attached at the entrance or beginning of the shield. Moreover, provision can be made to install a camera in order to monitor the system components for proper function, that are covered by the shield.

In a further embodiment of the invention, the at least one radiation source is switched on when the object has been advanced into the scanning area. Before the object reaches the end of the scanning area, the advance in the transport direction is stopped so that the object is in a position of rest for the scanning process. The object is scanned in two directions, opposite to the transport direction and in the transport direction. At the first scan, for example, the object is exposed to low-energy radiation and at the subsequent scan, it is exposed to high-energy radiation. The individual image segments thus recorded are recorded separately, and one of them is mirrored so that together they produce a single, pixel-precise image segment for this scanned portion of the object that is analyzed and, for example, displayed as an image of the object in a known manner.

If only one radiation source is used, it must be switched over each time to provide the different radiation energies.

In another advantageous embodiment, two radiation sources may be integrated into the inspection device.

BRIEF DESCRIPTION OF THE DRAWINGS

The invention is described and explained in more detail with reference to the drawings. The described and drawn features can be used individually or in preferred combinations in other embodiments of the invention. The foregoing and other objects, features and advantages of the invention will be apparent from the following, more particular description of the invention, as illustrated in the drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
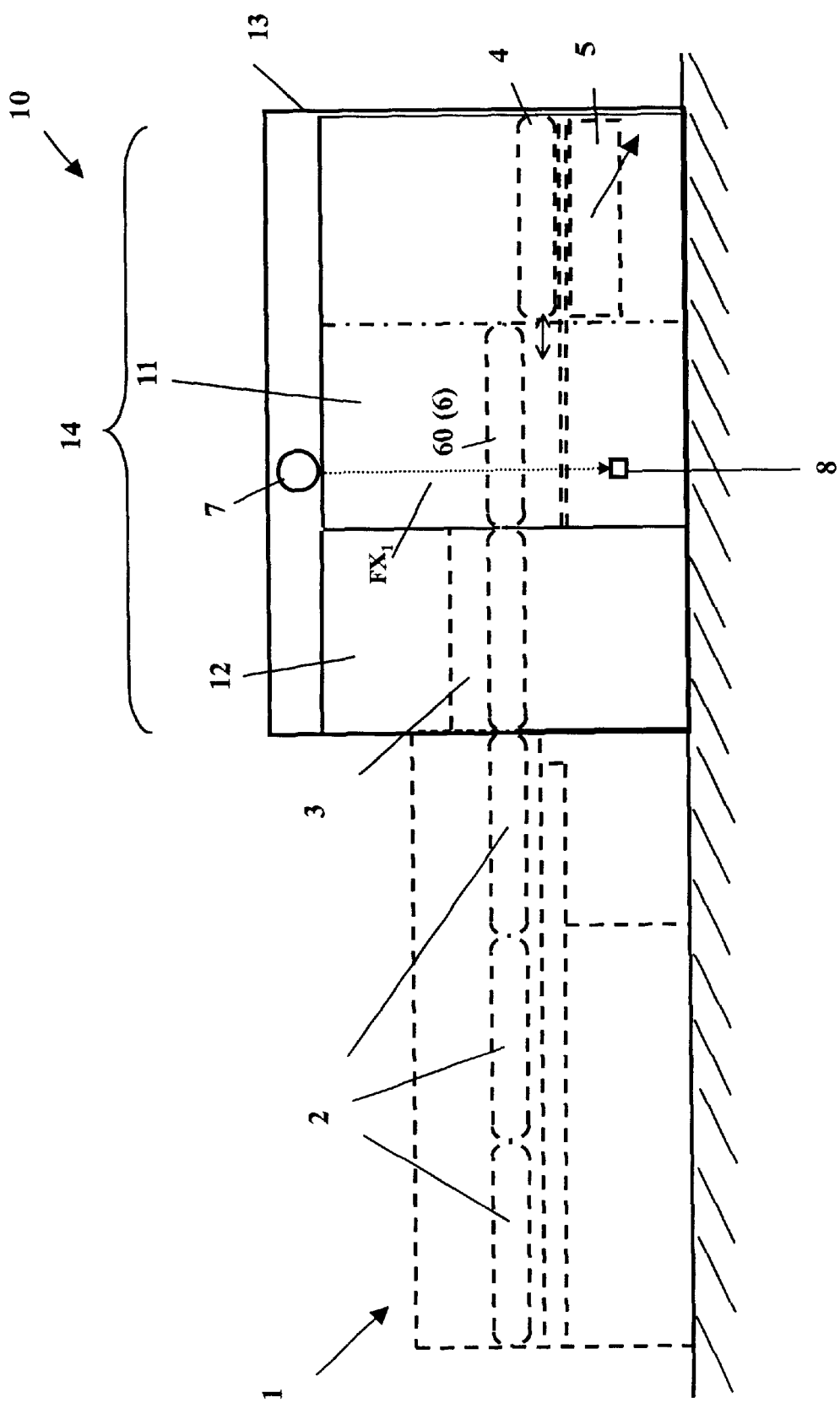
FIG. 1 is a cross-sectional view of a conventional transport system, which is to be integrated into an inspection device.

As shown in FIG. 1, a separate piece of equipment 1, here a transport system, is functionally independent from an inspection device 10, and is part of a check-in counter to be retrofitted with the inspection device 10.

The separate piece of equipment 1 has individual transport belts 2, which convey objects 20 (not shown here), for example a suitcase or other pieces of baggage, to a so-called flipper or tipping belt 3. The tipping belt 3 moves the objects 20 that are standing on the belts 2 into a horizontal position and centers them for further transport. This is followed by a belt 6 and a belt 4. At the end of a transport section of the transport system 1, the object 20 is placed in a tray 5 by the belt 4. For this purpose, the belt 4 travels beneath belt 6, for which reason the belt 4 is installed lower than the belt 6. Thereafter, the tray 5 with the object 20 is transferred from the transport system 1 to another transport system, which is not shown.

Inspection of the objects 20, more particularly for explosive substances, is intended here to take place after the tipping belt 3. This area, however, which is formed for example by the belt 6, is very short for a retrofit of this nature, because the length of the belt 6 typically is not longer than one maximum suitcase length, which in practice is maximally approximately 100 cm long.

As shown in FIG. 1, provision is made to exchange the existing belt 6 for a radiation-transmissive belt 60, and preferably to provide a sliding plate 61 beneath the belt 60, that has a low absorption and supports the belt 60. The length of the belt 6 of the separate piece of equipment 1 defines the maximum length of the belt 60 and the sliding plate 61, and thus the maximum length of the scanning area for the object 20. The scanning area determines the length of a transport shaft 11, which is part of a radiation tunnel 14 of the inspection device 10, about which are affixed at least one radiation source 7 as well as a detector arrangement 8 aimed at the radiation source 7. The radiation source 7 and also the detector arrangement 8, here a linear detector, are movable and can be displaced parallel to the belt 60 and the sliding plate 61, as well as in the direction of and opposite to the transport direction of the object 20.

The method is described with reference to FIGS. 2a–h.

Figure 2A:
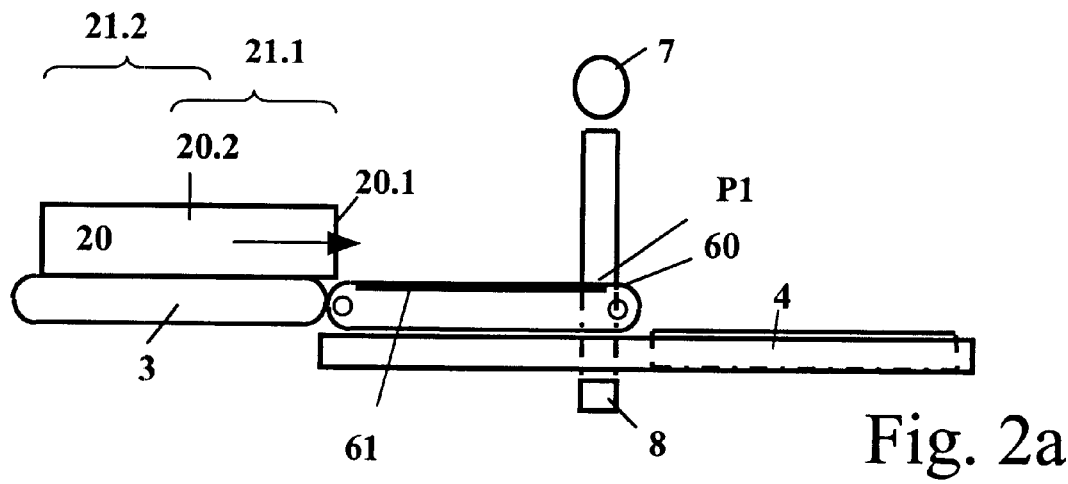
FIGS. 2a–2h are schematic illustrations representing the individual steps of the scanning process.
Figure 2B:
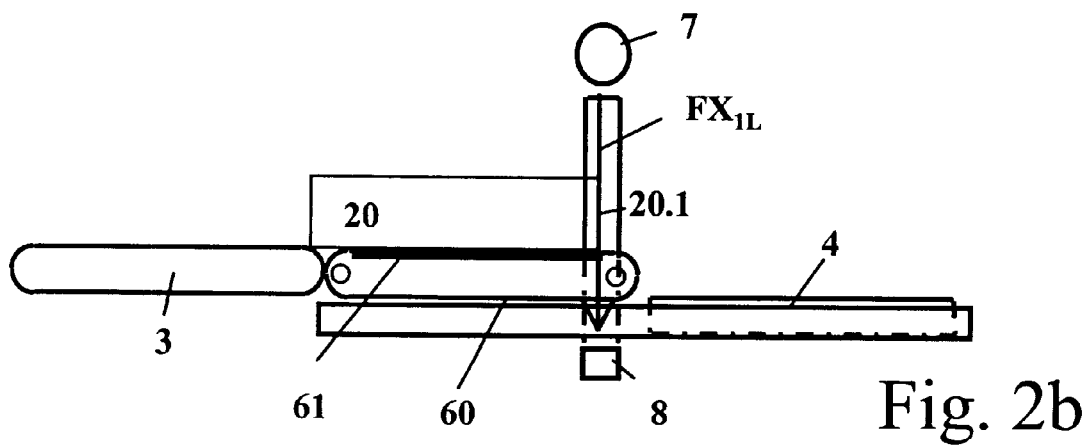
Figure 2C:
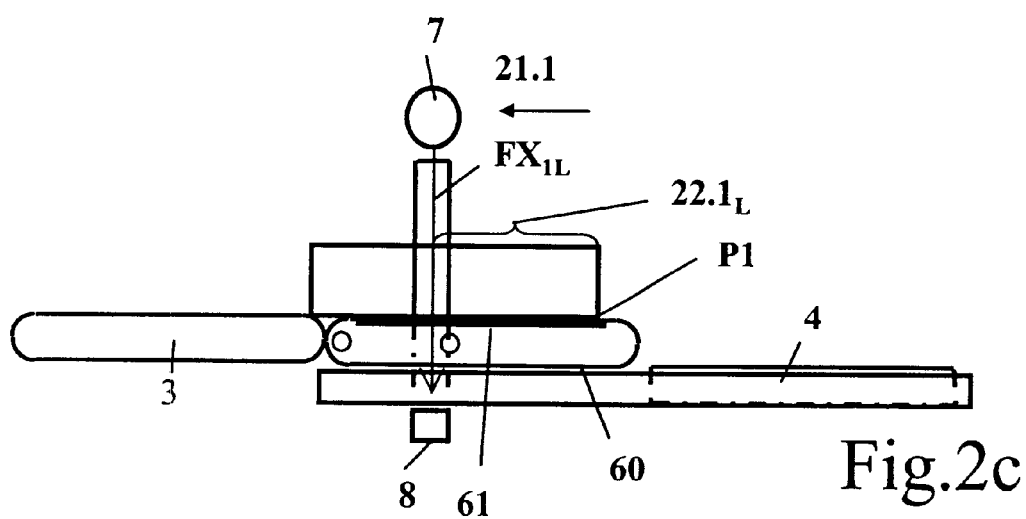

As shown in FIG. 2a, the object 20 is transported from a preceding system component, in this case the tipping belt 3, to the belt 60, and as can be seen in FIG. 2b, is advanced between the radiation source 7 and the linear detector 8, where a first part of the object 20.1 is located a defined distance from the end of the belt 60. While the luggage 20 now remains in this position, the radiation source 7 is moved together with the linear detector 8 out of a first position P1 above a first region 21.1 in a direction opposite to the transport direction of the object 20 and in the meantime the object 20 is scanned with a low-energy radiation beam $FX_{1L}$, as shown in FIG. 2c. A low-energy image segment $22.1_L$ is then recorded and stored in a computer, which is not shown.

Figure 2D:
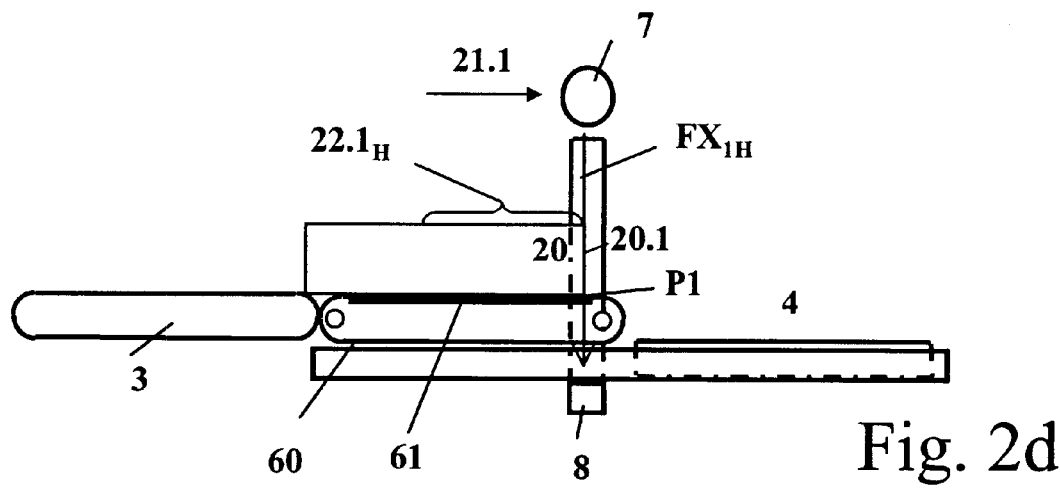

Then the object 20 is again scanned over the first region 21.1, in the direction opposite to the first scan direction, up to the first position P1, whereby the energy range of the radiation source 7 was previously switched over and the object 20 is then exposed to high-energy radiation $FX_{1H}$, as shown in FIG. 2d.

A high-energy image segment $22.1_H$ is recorded and combined with the low-energy image segment $22.1_L$ stored in the computer, to produce a first image segment 22.1 of the object 20 and analyzed. This step can be performed at this time, but may also be performed after the complete scanning process has been finished.

Figure 2E:
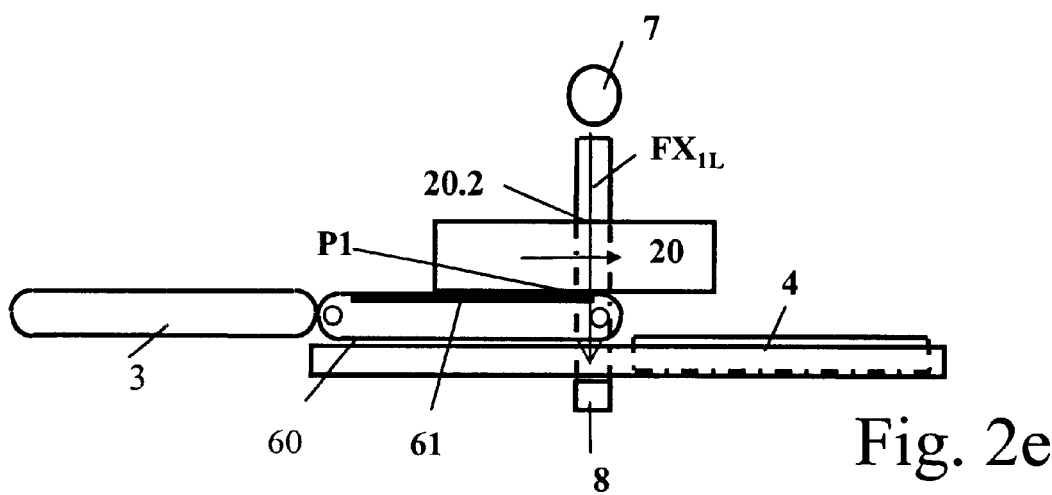
Figure 2F:
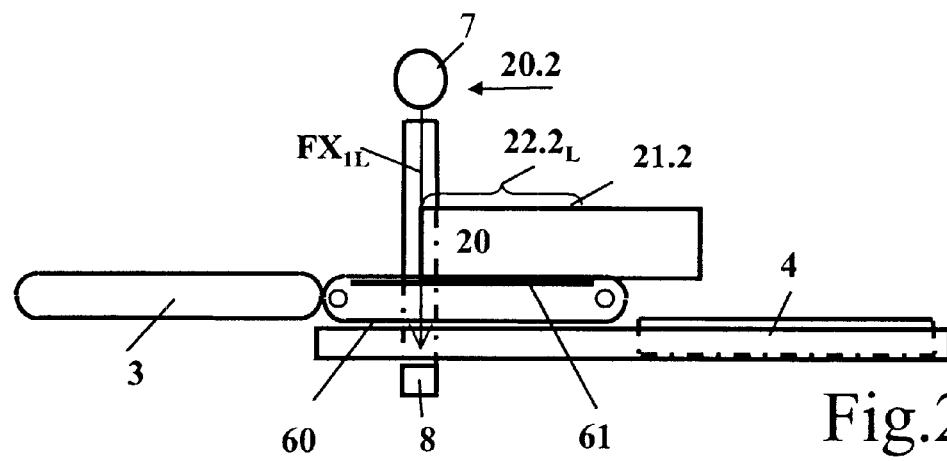

Regardless, the object 20 is conveyed far enough, such that the object center 20.2 comes to rest just in front of the radiation plane of the beam $FX_1$ in front of the position P1, as shown in FIG. 2e. The energy range of the radiation source 7 is preferably switched over again, to the low-energy radiation $FX_{1L}$. It is advantageous to have a certain overlapping of the first region 21.1 and the following, to be scanned region 21.2.

Figure 2G:
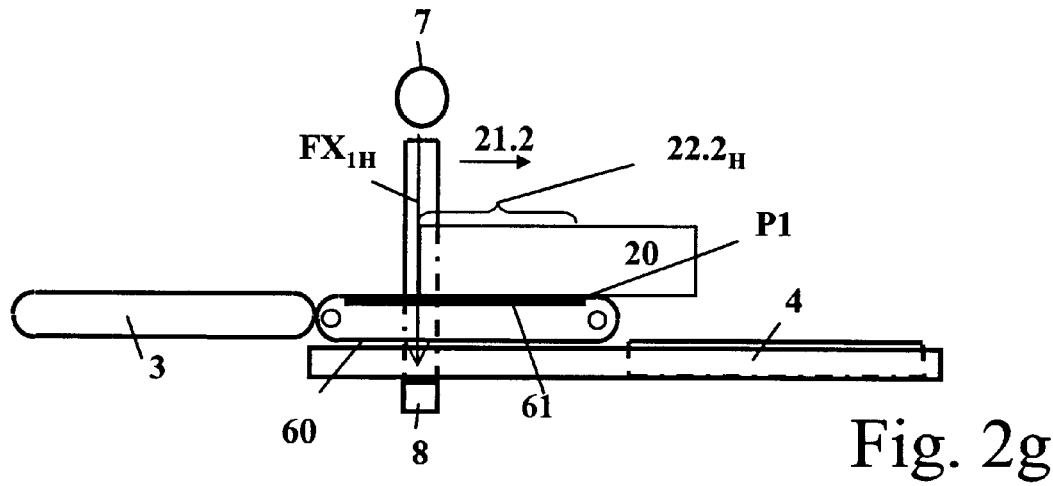
Figure 2H:
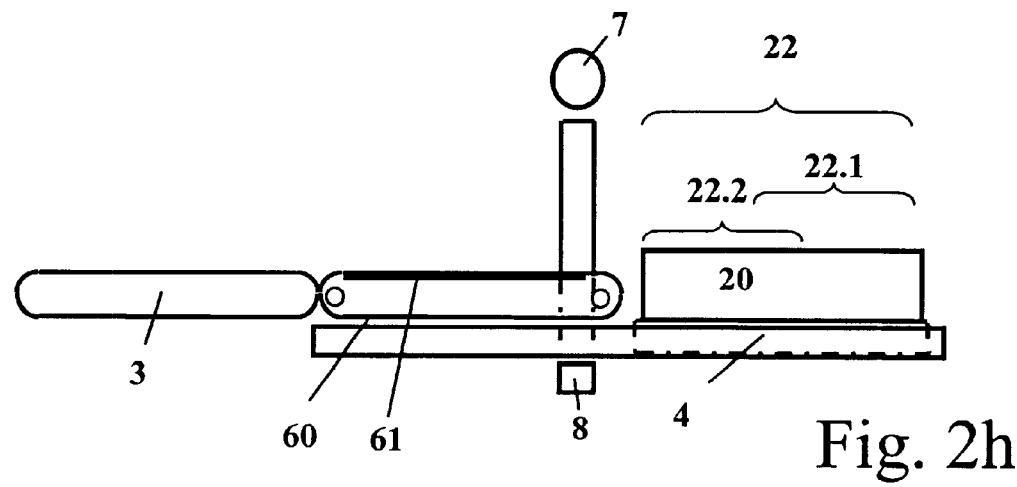

This is followed again by the joint movement of the radiation source 7 and the linear detector 8 in the direction opposite to the transport direction of the object 20 from the position P1, in order to scan over the second region 21.2, first with the low-energy radiation $FX_{1L}$ (FIG. 2f) and subsequently with the high-energy radiation $FX_{1H}$, (FIG. 2g). An obtained low-energy image segment $22.2_L$ and high-energy image segment $22.2_H$ form a second joint image segment 22.2.

The two obtained image segments 22.1 and 22.2 are combined into a whole image 22 (indicated in FIG. 2h), where the overlapping region is taken into account during an analysis of the whole image 22 of the object 20.

The object 20, which is then transferred to belt 4, is removed out of the inspection device 10 in a known manner.

The radiation source 7 and the linear detector 8 are moved synchronously, which can be performed by, for example, linear guides with a spindle drive (not shown), that are centrally actuated. This can be coordinated and monitored by a computer.

The radiation tunnel 14 formed by the transport shaft 11, with a belt length of at most one maximum suitcase length, however, is too short. It is extended by the integration of the belts 2, 3, 4 located before and/or after belt 60. In order to incorporate at least the tipping belt 3 located ahead of the transport shaft 11, a front shield 12 that works in cooperation with the transport shaft 11 is placed over it, causing the radiation protection to be extended forward so that no radiation can escape from there.

In addition to the possibility of providing a shield hood here as well for radiation protection of the incorporated belt 4, in a preferred embodiment, this belt 4 is integrated in the protective housing 13 of the inspection device 10.

In another advantageous variant, a closable curtain or roller shutter is integrated in the shield 12, which preferably is attached at the entrance of the shield 12, and thus also closes the entrance to the tipping belt 3 during the actual inspection procedure (not shown in the drawings).

Moreover, it is advantageous to install a camera (not shown) within the shield 12, in order to monitor proper functioning of the tipping belt 3.

The linear detector 8 is comprised of a plurality of detector pairs that preferably have at least one low-energy detector and one high-energy detector located behind it (not shown in the figures).

It is also possible within the scope of the invention that the belts 3 and 4 of the separate piece of equipment 1 are not incorporated in the housing 13 of the inspection device 10, but rather the inspection system 10 with its belt 60 is incorporated in a housing of the separate piece of equipment (not shown).

Figure 3:
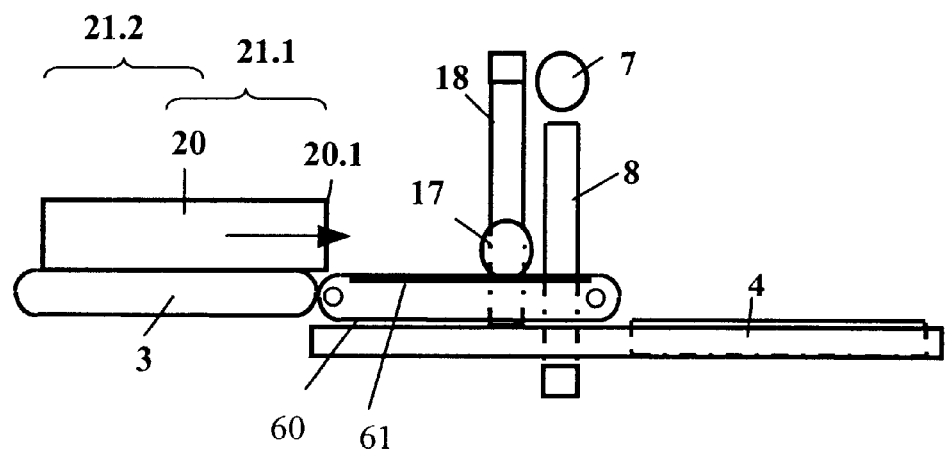
FIG. 3 is a cross-sectional view of another embodiment of the inspection device, which has at least two radiation sources.

Moreover, the invention is not limited to the use of only one radiation source 7 and one linear detector 8 aimed at the radiation source 7. It is also possible to provide at least one additional radiation source 17, which, for example, is arranged to the side of the first radiation source 7 and at which is aimed another linear detector 18, as shown in FIG. 3. These items can also be affixed within the inspection device 10 such that they are movable.

Since one maximum suitcase length is approximately 100 cm in practice, the aforementioned solution provides an inspection device 10 that can be installed in a small area with little effort.

While the invention has been particularly shown and described with reference to a preferred embodiment, it will be understood by those skilled in the art that various changes in form and detail may be made therein without departing from the spirit and scope of the invention.

What is claimed is:

1. An inspection device for inspection of an object, in which the object to be inspected is moved between at least one radiation source and at least one linear detector arrangement directed at said radiation source for scanning the object, while the object is stationary, wherein the radiation source and the linear detector arrangement are moved in parallel over the object so that the object is scanned in the direction of transport of the object and also scanned in a direction opposite to the direction of transport of the object, wherein
        during a first scan the object is scanned with low-energy radiation, and during a second scan the object is scanned with high-energy radiation.

2. The inspection device according to claim 1, wherein the low-energy radiation, and also the high-energy radiation of the at least one radiation source are each turned on by switching the radiation source over.

3. The inspection device according to claim 1, wherein the object is scanned again after stepwise advance of the object until the entire object has been scanned.

4. The inspection device according to claim 1, wherein an image segment recorded during said first scan, and an image segment recorded during said second scan together constitute a joint image, which is analyzed.

5. The inspection device according to claim 1, wherein
    the inspection device is integrated in a housing of a separate system or vice versa, and
    in order to extend a radiation tunnel of the inspection device in front of a scanning region, a shield that works together therewith is affixed onto or around a system component that is part of a separate piece of equipment.

6. The inspection device according to claim 5, wherein a system component of the separate piece of equipment is incorporated into the inspection device and equipped with shielding.

7. The inspection device according to claim 5, wherein a radiation transmissive belt, which replaces a belt of the separate piece of equipment, is incorporated in the scanning region.

8. The inspection device according to claim 6, wherein the system component is incorporated in a shield housing of the inspection device.

9. The inspection device according to claim 1, wherein the radiation source and the linear detector arrangement are moved synchronously but mechanically independent of one another, through the control of a computer.

10. The inspection according to claim 5, wherein the separate piece of equipment is a transport system of a check-in counter.

11. The inspection device according to claim 5, wherein the length of the shield is not shorter than one maximum suitcase length.

12. The inspection device according to claim 11, wherein the maximum suitcase length is 100 cm.

13. The inspection device according to claim 5, wherein a closable curtain or roller shutter is integrated in the shield.

14. The inspection device according to claim 13, wherein the curtain or roller shutter is attached at the entrance or beginning of the shield.

15. The inspection device according to claim 5, wherein a camera is provided inside the shield.

16. The inspection device according to claim 7, wherein a sliding plate with low absorption is integrated in the belt.

* * * * *